United States Patent Office 2,910,751
Patented Nov. 3, 1959

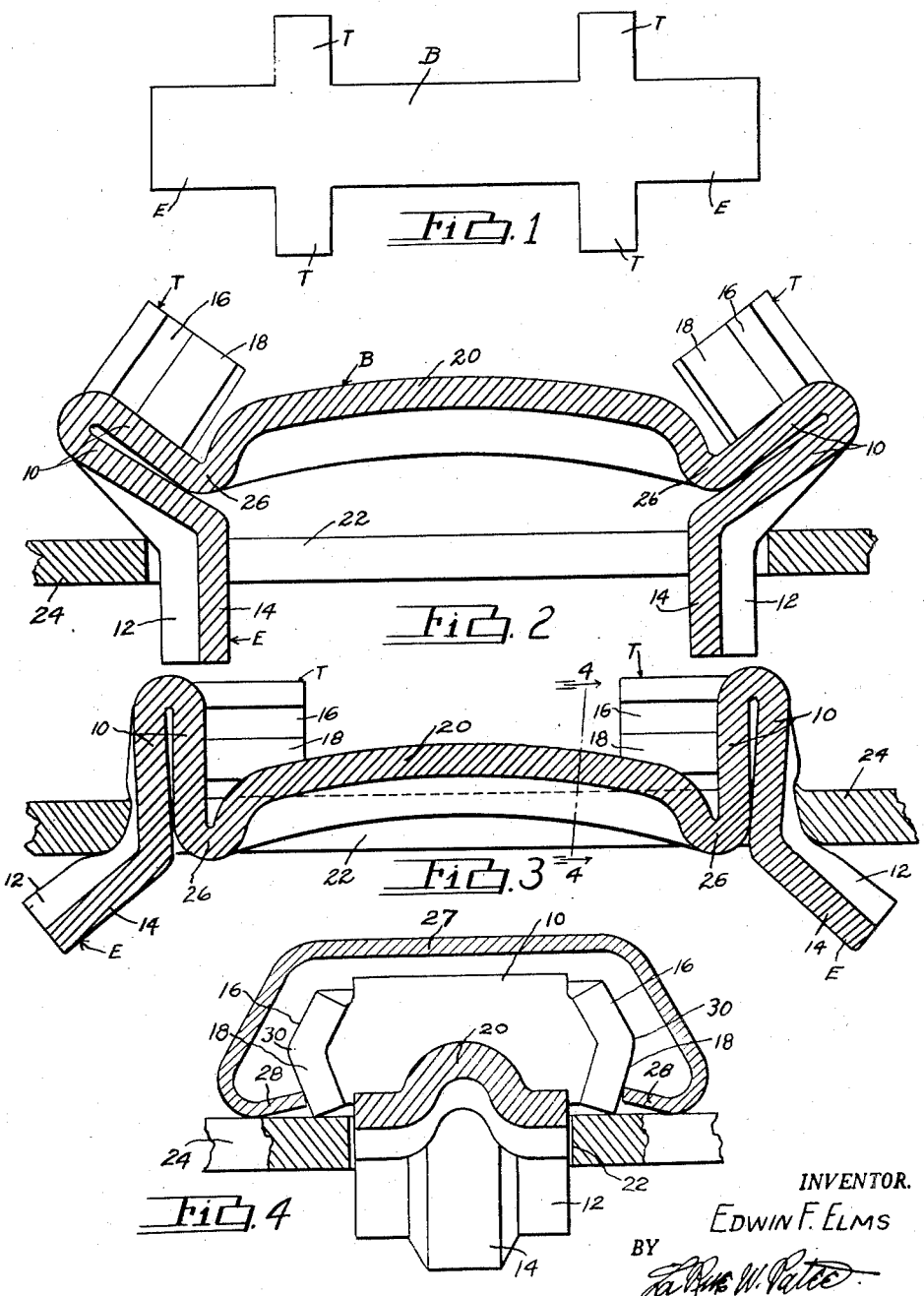

2,910,751

FASTENER

Edwin F. Elms, Roseville, Mich., assignor to Robert L. Brown, Ferndale, Mich.

Application October 19, 1956, Serial No. 617,197

6 Claims. (Cl. 24—73)

This invention relates to a metallic fastener for securing molding to a panel such as ornamental beading to an automobile body.

It is an object of the present invention to provide a fastener for insertion into an opening in a panel which may be readily and securely locked in the opening by a bending operation which, at the same time, positions molding retaining tabs in proper location to which is applied a hollow molding by a snap-on operation.

Another object of the invention is to provide reenforced bendable portions of the fastener which may be operated from one side of the fastener and the panel, to draw extensions projecting through the panel opening into tight engagement with the inner edge of the panel opening.

Other objects and advantages of the invention will be more fully understood from the following description taken in connection with the accompanying drawings in which:

Fig. 1 is a top plan view of the sheet metal blank from which the fastener is formed;

Fig. 2 is a cross sectional view of the fastener, showing its insertion in an opening in a panel, before it is bent to its locked position;

Fig. 3 is a view corresponding to Fig. 2 but showing the parts bent to locked position; and Fig. 4 is a cross sectional view taken on line 4—4 of Fig. 3 with a molding strip in cross section applied thereto.

Referring to the drawings, the fastener is formed from a sheet metal blank having a central body portion B, end portions E and laterally projecting tabs T at the opposite edges of the body portion B. The sheet metal blank is preferably made of malleable material so that in formation the metal takes a permanent shape as distinguished from spring steel or resilient material.

The end portions E are folded back upon the under side of the body portion B forming a two ply portion 10 which is bent upwardly out of the plane of the body portion B. The outer free end of the folded back portion is bent downwardly forming an outwardly extending flange 12. Added rigidity to the portion 10 and flange 12 is obtained by a longitudinally extending rib 14 pressed into the flange 12 which spans the angle between the portion 10 and the flange 12.

The tabs T are bent upwardly at right angles to the plane of the body portion B with the side edges bent inwardly forming a guide flange 16 and a holding flange 18. These flanges 16 and 18 are integral with one thickness of the metal in the portion 10 between the end E and body B and move with the bendable portion 10.

The body portion B is slightly domed and is provided with a rib 20 to stiffen the body.

After the fastener is formed and before it is applied to a panel, the two ply portions 10 are divergent, extending at an angle of approximately forty-five degrees to the plane of the body B and the flanges 12 extend parallel to each other and at right angles to the body B.

The flanges 16 and 18 extend in convergent relation above and at opposite sides of the body B. This form of the fastener is disclosed in Fig. 2.

When the fastener is applied to a supporting panel, the downwardly extending flanges 14 are readily inserted through a generally rectangular opening 22 in a panel 24, the divergent portions 10 resting on the upper end edges of the opening with the flanges 16 and 18 spaced from the panel 24. The fastener is securely locked to the panel by the bending of the two ply portions 10 toward each other about a point 26 with a suitable tool, such as a pair of pliers. This bending action causes the flanges 12 to be turned outwardly in divergent relation and underneath the bottom edges of the opening 22 in the panel 24. The edges are slightly deformed and the outer surfaces of the flanges are slightly deformed, biting into the panel, securely locking the fastener to the panel. This action draws the body of the fastener downwardly into the opening 22 and closes the opening. The flanges 18 come to rest in proper location on the upper surface of the panel 24.

The trim molding 27 has a pair of spaced inwardly extending flanges 28 which are received on the tapered surfaces of the flanges 18. The tapered flange 16 acts as a guide for spreading the flanges 28 as they are snapped over the bowed out portion 30.

It will be understood that the size, shape and arrangement of parts may be varied to suit various conditions without departing from the invention and it is intended to include such reasonable changes within the terms of the appended claims.

I claim:

1. A malleable sheet metal fastener for use in securing a part to an apertured panel comprising, a body portion, reversely bent end portions integral with said body forming bendable upwardly divergent portions extending above the plane of said body portion, downwardly extending flanges projecting below the plane of said body portion and carried by said divergent portions, and laterally and inwardly extending part holding flanges carried by said divergent portions for engaging the upper surface of the panel when said downwardly extending flanges are bent into holding engagement with the lower surface of the panel by bending said upwardly divergent portions inwardly.

2. A malleable sheet metal fastener for use in securing a part such as a flanged hollow molding to an apertured supporting panel comprising, a body portion, upwardly divergent bendable portions integral with said body, a downwardly extending flange integral with said divergent portions, and laterally extending converging side flanges carried by said divergent portions forming a holding means on the upper surface of the supporting panel when said downwardly extending flanges are bent into holding engagement with the lower surface of the panel by bending said upwardly divergent portions inwardly.

3. A sheet metal fastener comprising, a body portion, lateral projections integral with said body portion each folded back upon itself to provide bendable portions of double thickness extending above the plane of said body portion, the outer free ends of said projections extending beyond the double thickness portion and projecting below the plane of said body portion, the portion of double thickness extending in an acute angle to the plane of said body portion, and side molding holding flanges carried by said double thickness portions, said molding holding flanges when moved downwardly by bending said portions of double thickness engaging the upper surface of a supporting panel to which the fastener is applied.

4. A sheet metal fastener comprising, a body portion, lateral projections integral with said body portion and projecting upwardly in divergent relation to said body portion, a projection extending below said body portion adapted to be bent in divergent relation to said body portion by bending said first named projections, and a molding holding flange carried by said first named projections.

5. A sheet metal fastener for use in securing a part to an apertured panel comprising, a body portion, lateral projections integral with said body portion and projecting upwardly in divergent relation to said body portion, projections integral with said lateral projections for extending through the aperture and below said body portion adapted to be bent in outwardly divergent relation to said body, by bending said first named projections, into holding engagement with the under side of the panel, and holding portions integral with said lateral projections for engagement with the upper surface of the panel when said lateral projections are bent into holding position.

6. A sheet metal fastener for use in securing a part to an apertured panel comprising, a body portion, lateral projections integral with said body portion, and projecting upwardly in divergent relation to said body portion, projections integral with said lateral projections for extending through the aperture and below said body portion adapted to be bent in outwardly divergent relation to said body into holding engagement with the under side of the panel by bending said first named projections, and holding portions integral with said lateral projections for engagement with the upper surface of the panel when said lateral projections are bent into holding position, said lateral projections and said body portion forming a closure for the aperture in the panel.

References Cited in the file of this patent

UNITED STATES PATENTS

| | | |
|---|---|---|
| 2,217,781 | Wiley | Oct. 15, 1940 |
| 2,322,656 | Murphy | June 22, 1943 |
| 2,360,647 | Churchill | Oct. 17, 1944 |
| 2,618,193 | Peckham | Nov. 18, 1952 |
| 2,748,645 | Peckham | June 5, 1956 |
| 2,783,513 | Elms | Mar. 5, 1957 |